(12) United States Patent
Kwon et al.

(10) Patent No.: US 8,679,616 B2
(45) Date of Patent: Mar. 25, 2014

(54) SKEW-ANGLE RADIUS FILLER

(75) Inventors: Hyukbong Kwon, Mukilteo, WA (US);
Daniel Patrick Murphy, Mercer Island, WA (US); Karl B. Lee, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 486 days.

(21) Appl. No.: 12/967,697

(22) Filed: Dec. 14, 2010

(65) Prior Publication Data
US 2012/0148801 A1 Jun. 14, 2012

(51) Int. Cl.
*B32B 3/00* (2006.01)
*B32B 3/02* (2006.01)
*B32B 7/00* (2006.01)

(52) U.S. Cl.
USPC ............................. 428/157; 428/119; 428/156

(58) Field of Classification Search
USPC .............. 428/119, 120, 156, 157; 244/117 R, 244/119, 120, 126, 131, 132, 133, 123.1
See application file for complete search history.

(56) References Cited

U.S. PATENT DOCUMENTS

2008/0128554 A1 6/2008 Pham et al.
2010/0320320 A1* 12/2010 Kismarton ................. 244/119

FOREIGN PATENT DOCUMENTS

EP 1010615 A2 6/2000
EP 1970303 A2 9/2008

OTHER PUBLICATIONS

"Filler, Structural, Rectangular, Radiused Edge, Carbon Fiber Composite"; Boeing Part Standard, p. 70.16.6.25.1; Aug. 31, 2007.
"Filler, Rectangular, Radiused Edge, Aluminum Alloy"; Boeing Part Standard, p. 70.16.6.8.1; Jun. 8, 1987.
International Search Report and Written Opinion dated Feb. 24, 2012 in PCT Application No. PCT/US11/59302.

* cited by examiner

*Primary Examiner* — Catherine A Simone
(74) *Attorney, Agent, or Firm* — Hope Baldauff, LLC

(57) ABSTRACT

Technologies are described herein for enhancing joint capability and reducing the risk of delaminating a stringer using skew-angle radius fillers. A skew-angle radius filler for enhancing joint capability includes a top surface and a bottom surface separated by a thickness. The radius filler also includes a radius contact side that has an edge radius that is sized to match a radius of a web joint of a stringer. The radius filler also includes a pair of opposing non-parallel sides that may extend from the radius contact side at an acute angle, and a rear side that is shorter than the radius contact side.

20 Claims, 7 Drawing Sheets

SKEW-ANGLE RADIUS FILLER

FIELD OF DISCLOSURE

The field of disclosure generally relates to radius fillers. In particular, the field of disclosure relates to skew-angle radius fillers to reduce the risk of delamination of a laminated stringer assembly.

BACKGROUND

An aircraft wing box provides the structural core for an aircraft wing. The wing box includes a series of rib segments that are spaced apart longitudinally and connected to one or more wing spars and stringers extending the length of the wing box. The stringers are used to attach the wing skin or outer layer of the wing to the rib segments of the wing box. The stringers may structurally support the wing skin and transfer skin loads to the internal structure of the wing. In carbon fiber reinforced plastic (CFRP) stringer fabrication, each stringer may be made of multiple structural components, or members, that are cured and/or bonded together to form the stringer.

For example, a CFRP I-stringer 100, as shown in FIG. 1 is formed by curing two preformed C-shaped charge members 110, 120 together to form the web and portions of the upper flanges 112, 122 and lower flanges 114, 124 of the stringer 120. A top member 130 and a bottom member 140 are also cured to the upper flanges 112, 122 and lower flanges 114, 124 of the connected C-shaped charge members 110, 112 to create a top cap and bottom cap, respectively. A strip of material, such as called a noodle 150 is used between the top member 130 and C-shaped charge members 110, 120 and a bottom noodle 160 between the bottom member 140 and C-shaped charge members 110, 120, in order to fill in the applicable spaces. When all components are cured together, the CFRP I-stringer 100 is formed and ready for use.

One problem encountered with CFRP stringers is that they may be prone to delamination if excessive shear and moment forces are imparted on the stringer. Common locations for increased shear and moment forces on the stringer include locations where the ribs are bolted to the stringers. The delamination is likely to occur at a region around the noodles 150, 160 of the I-stringer 100. To decrease the likelihood of delamination, radius fillers are used at the locations where the ribs are bolted to the stringers. Radius fillers are conventionally configured as rectangular pieces of material that are sandwiched between the rib and stringer. They have an edge that is shaped to abut the junction of the vertical member 116 and the lower flange 114 of the C-shaped charge member 110, and to fill the radius 118 formed between the vertical member 116 and the lower flange 114 of the C-shaped charge member 110. In doing so, the radius fillers provide additional structural reinforcement to this joint and distribute the shear and moment forces in order to reduce the risk of delamination at the noodle region of the I-stringer 100.

One problem encountered with CFRP stringers is that they may be prone to delamination if excessive shear and moment forces are imparted on the stringer. Common locations for increased shear and moment forces on the stringer include locations where the ribs are bolted to the stringers. The delamination is likely to occur at the noodle region of the I-stringer. To decrease the likelihood of delamination, radius fillers are used at the locations where the ribs are bolted to the stringers. Radius fillers are conventionally configured as rectangular pieces of material that are sandwiched between the rib and stringer. They have an edge that is shaped to abut the junction 118 of the vertical member 116 and the lower flange 114 of the C-shaped charge member 110, and to fill the radius formed between the vertical member 116 and the lower flange 114 of the C-shaped charge member 110. In doing so, the radius fillers provide additional structural reinforcement to this joint and distribute the shear and moment forces in order to reduce the risk of delamination at the noodle region of the I-stringer.

However, despite the use of conventional radius fillers, delamination may occur due to localized high shear loads and moments imparted at the web joint. This delamination results in a reduction of joint capability with a possibility of other undesirable effects. One solution may be to provide additional reinforcement at the web joint of the I-stringer. However, adding additional weight to the aircraft is undesirable.

It is with respect to these considerations and others that the disclosure made herein is presented.

SUMMARY

Technologies are described herein for enhancing joint capability and reducing the risk of delamination in a stringer using skew-angle radius fillers. Through the utilization of the technologies and concepts presented herein, the skin-stringer panel can withstand larger operational loads without delaminating using skew-angle radius fillers as compared to predecessor skin-stringer panels using rectangular radius fillers.

According to various aspects of the disclosure provided herein, a skew-angle radius filler for enhancing joint capability includes a top surface and a bottom surface separated by a thickness. The radius filler also includes a radius contact side that has an edge radius that is sized to match a radius of a web joint of a stringer. The radius filler also includes a pair of opposing non-parallel sides that may extend from the radius contact side at an acute angle, and a rear side that is shorter than the radius contact side.

According to other aspects, a structural system for redistributing operational loads imparted at a noodle region of a stringer assembly includes a rib segment that has a bottom surface. The stringer assembly includes a vertical member, a horizontal member that has an upper surface and a web joint at an interface between the vertical member and the horizontal member. The structural system also includes a radius filler configured to enhance joint capability at the web joint of the stringer assembly. The radius filler has a top surface in contact with the bottom surface of the rib segment and a bottom surface in contact with the upper surface of the horizontal member of the stringer assembly. The radius filler also includes a radius contact side having an edge radius that matches a radius of a web joint of the stringer assembly, a pair of opposing non-parallel sides that may extend from the radius contact side at an acute angle, and a rear side that is shorter than the radius contact side.

According to further aspects, a method of enhancing joint capability at a noodle region of a stringer is described. A bottom surface of a skew-angle radius filler is positioned on a top surface of a main component such that a radius contact side of the skew-angle radius filler abuts a web joint of the main component and a shorter rear side of the skew-angle radius filler is opposite the web joint. A bottom surface of a sub-component is positioned against a top surface of the skew-angle radius filler, and the main component, the skew-angle radius filler, and the sub-component are secured together utilizing an attachment means.

It should be appreciated that the above-described subject matter may also be implemented in various other embodiments without departing from the spirit of the disclosure.

These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
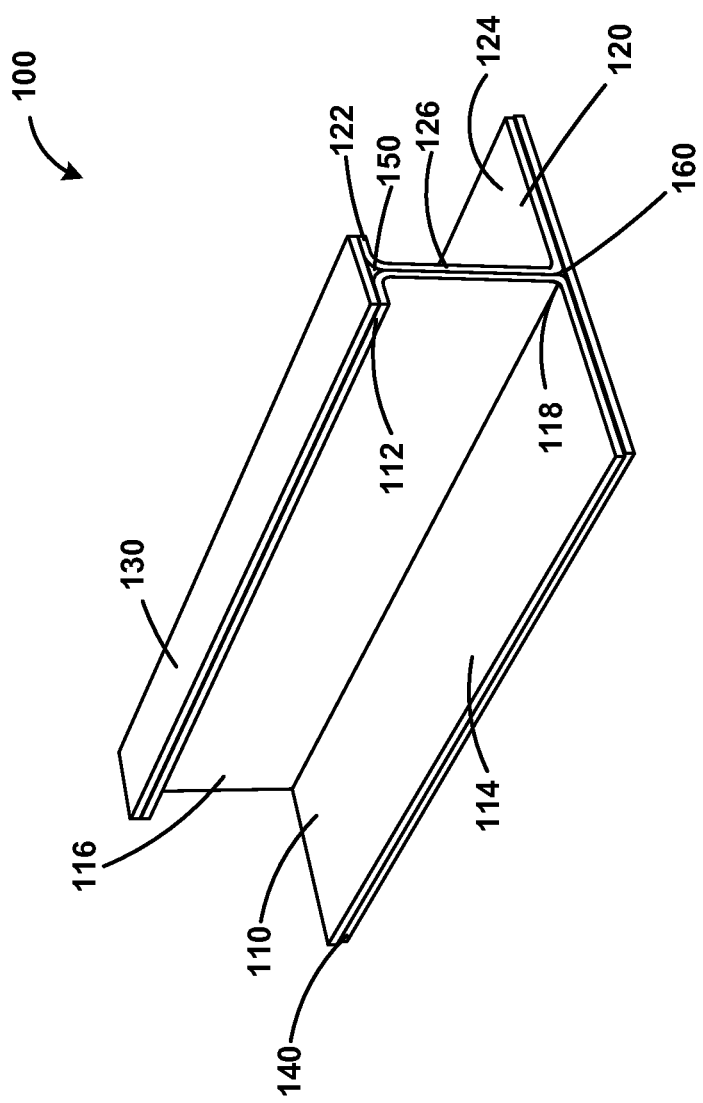
FIG. 1 is a prior art diagram shows a perspective view of a typical I-stringer.

Technologies are described herein for enhancing joint capability and reducing the risk of delamination in a stringer using skew-angle radius fillers. Through the utilization of the technologies and concepts presented herein, the stringer noodle can withstand greater out-of-plane (pull-off) loads without delaminating using skew-angle radius fillers as compared to predecessor stringers using conventional rectangular radius fillers.

In the following detailed description, references are made to the accompanying drawings that form a part hereof, and that show by way of illustration, specific embodiments or examples. Referring now to the drawings, in which like numerals represent like elements through the several figures, technologies for enhancing joint capability and reducing the risk of delamination of a skin-stringer assembly using skew-angle radius fillers according to the various embodiments will be described.

Figure 2:
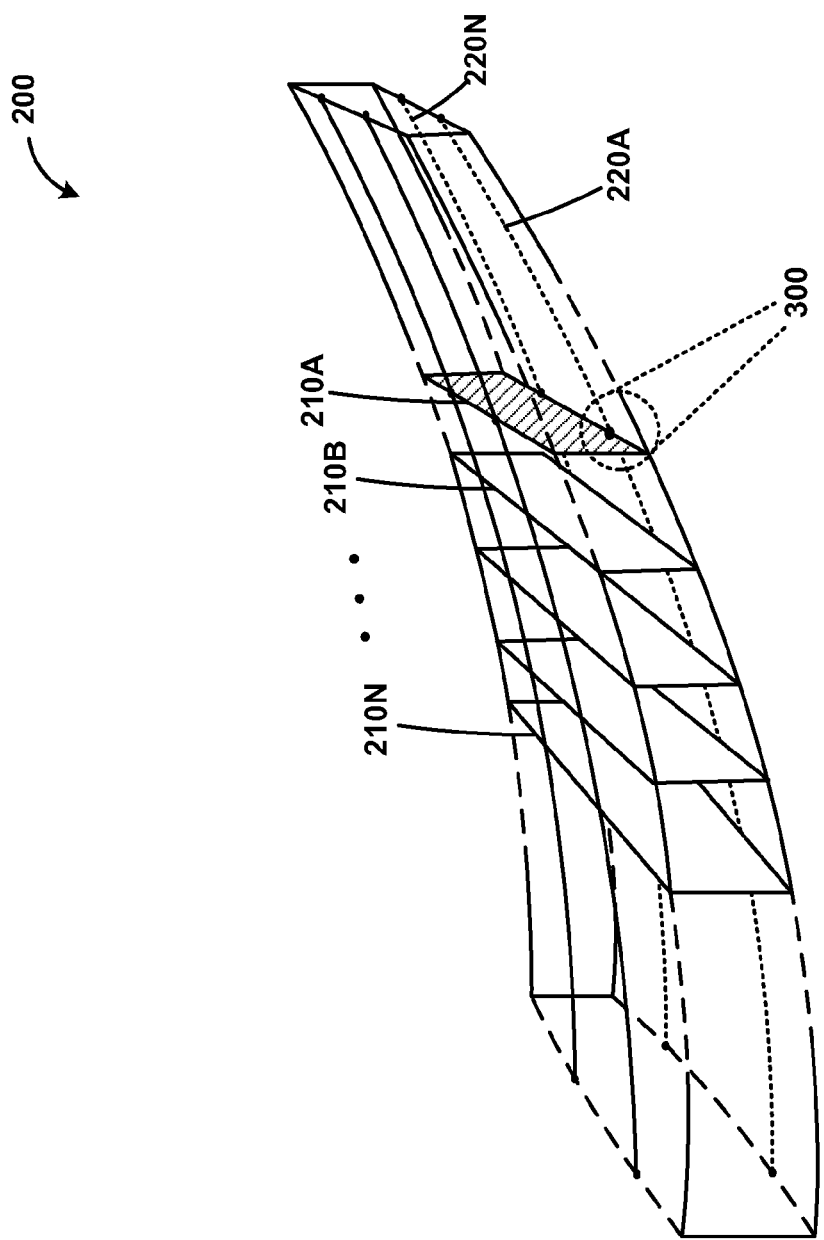
FIG. 2 shows a perspective view of a wing box of an aircraft wing, in accordance with some embodiments described herein.

FIG. 2 shows a perspective view of a wing box of an aircraft wing, in accordance with various embodiments. A wing box 200 is the structural core of an aircraft wing, and provides structural support as well as attachment points to various aircraft components that attach to the wing. The wing box 200 may include rib segments, 210A, 210B, 210N that extend transversely across the span of the wing box 200. Any particular rib segment, such as the rib segment 210A, may be generally referred to herein as a rib segment 210. The rib segment 210 may be attached to multiple stringers 220A, 220N that extend longitudinally along the span of the wing box 200. Any particular stringer, such as the stringer 220A, may generally be referred to herein as a stringer assembly 220. The stringer assembly 220 may be utilized to provide additional stiffness to the wing skin (not shown in FIG. 2) of the wing. According to various embodiments, the wing skin may be attached to the stringer assembly to form a skin-stringer panel.

It should be appreciated that the wing box 200 has been greatly simplified in the drawings for clarity purposes. For example, the wing spars and all aircraft system components that reside in the wing have not been shown. Additionally, only a small representative number of rib segments 210 and stringer assemblies 220 have been shown. Finally, the wing box 200 is shown to be flexed upward an exaggerated amount to demonstrate the stresses applied to the components of the wing box 200 during flight operations.

The rib segment 210 may attach to the stringer assembly 220 at one or more attachment points 300 using skew-angle radius fillers (not shown in FIG. 2), which are configured to enhance the joint capability of the stringer assembly, while reducing the risk of delamination of the various members of the stringer assembly 220 when operational loads are exerted on the stringer assembly 220. The attachment point 300 is an example of a location where the rib segment 210 may attach to the stringer assembly 220, and will be described in greater detail below with respect to FIG. 3.

One of the many considerations aircraft and aircraft component manufacturers have to take into consideration while designing and constructing aircraft parts is weight. There is a countervailing balance between structural benefit to weight that is considered for manufacturing purposes. As a result, the stringer assembly 220, which may be utilized to provide stiffness to the wing skin of the wing, may be made of materials that offer a high stiffness to weight ratio. An example of such a material is a carbon fiber reinforced plastic (CFRP). CFRP may be multiple layers of carbon fibers that are laminated together using epoxy or other type of plastic material. Further, the stringer assembly 220 may be made of various members or layers that are laminated or bonded together. As discussed above, these members may be prone to delamination when large out-of-plane (pull off) loads are applied to the stringer assembly 220. Shear forces and moment forces imparted on the stringer assembly 220 may cause the members of the stringer assembly 220 to separate from one another. It should be appreciated that the out-of-plane loads applied to the stringer assembly 220 may originate due to a combination of the bending of the wing during operation and the curvature of the wing skin around the wing. The various members of the stringer assembly 220 will be described in further detail with respect to FIG. 3.

Figure 3:
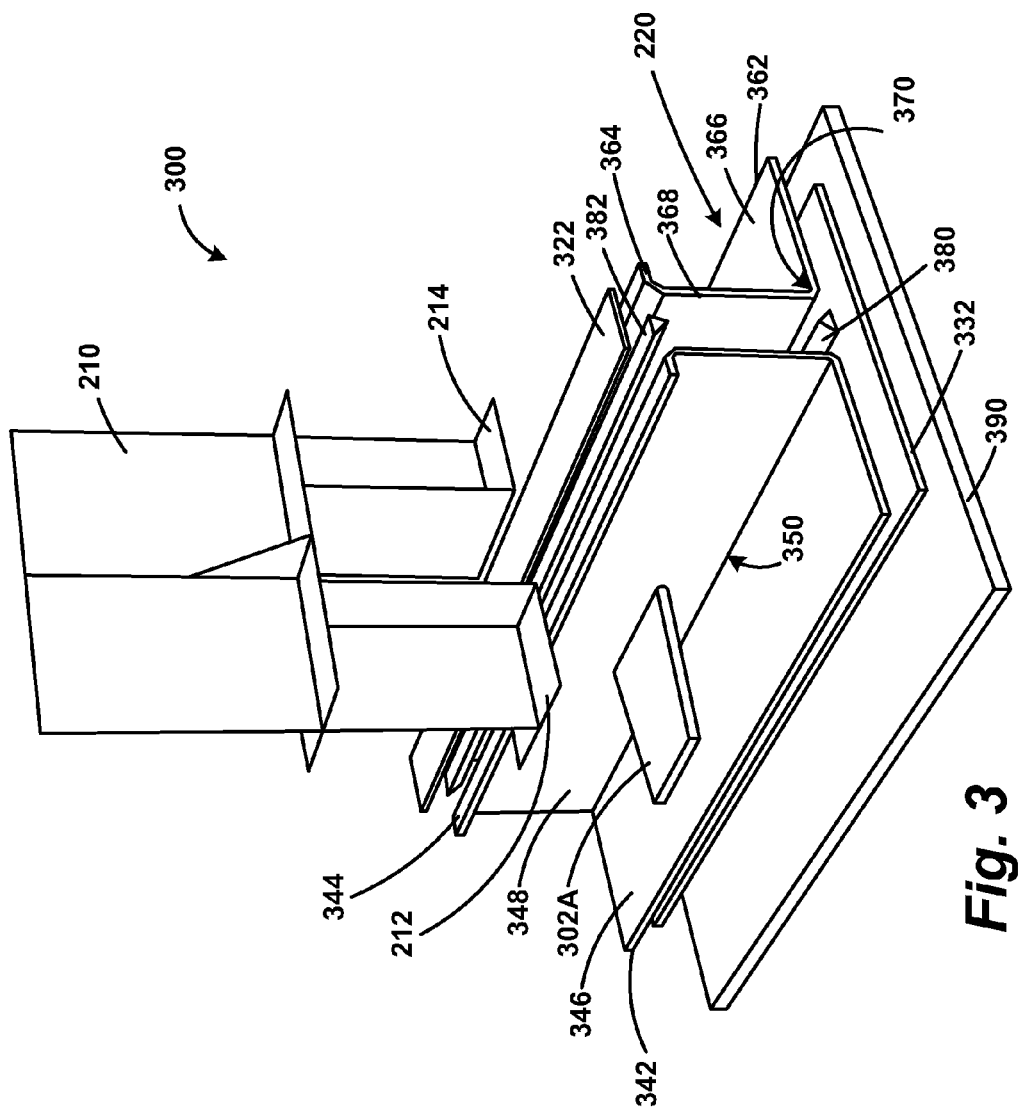
FIG. 3 shows a perspective view of an attachment region of the wing box shown in FIG. 2, in accordance with some embodiments described herein.

FIG. 3 shows a perspective, exploded view of an attachment point within the wing box shown in FIG. 2, in accordance with some embodiments. The attachment point 300 shows a portion of the rib segment 210, various members that form the stringer assembly 220, a left skew-angle radius filler 302A and a right skew-angle radius filler (not shown in FIG. 3), and a portion of the wing skin 390 that may be attached to the stringer assembly 220. The left skew-angle radius filler 302A and the right skew-angle radius filler may generally be referred to as a skew-angle radius filler 302.

According to embodiments, the stringer assembly 220 may have an I-shaped configuration. In such a configuration, the stringer assembly 220 may include a top member 322, a base member 332, a left charge member 342, a right charge member 362, a lower noodle member 380, and an upper noodle member 382. The left charge member 342 may include a left upper flange 344 and a left lower flange 346 joined together by a left vertical member 348. According to embodiments, the left lower flange 346 may be known as a horizontal member because it has a horizontal orientation. The region where the left vertical member 348 meets the left lower flange 346 may be curved, and is referred to as a lower left web joint 350.

Similarly, the right charge member 362 may also include a right upper flange 364 and a right lower flange 366 joined together by a right vertical member 368. The right charge member 362 may also include a lower right web joint 370 where the right lower flange 366 meets the right vertical member 368 of the right charge member 362. The lower right web joint 370 may also be curved. In some embodiments, the radius of the lower web joints 350, 370 corresponding to the left charge member 342 and the right charge member 362 may be the same.

The lower noodle member 380 is positioned between the left charge member 342 and the right charge member 362 such that when the stringer assembly 220 is assembled, the lower noodle member 380 is in contact with the left charge member 342, the right charge member 362 and the base member 332. Similarly, the upper noodle member 382 is positioned between the left charge member 342 and the right charge member 362 such that when the stringer assembly 220 is assembled, the upper noodle member 382 is in contact with the left charge member 342, the right charge member 362 and the top member 322. As described above, the wing skin 390 may be bonded to the base member 332 of the stringer assembly 220 to form a skin-stringer panel. It should be appreciated that the stringer assembly 220 shown in FIG. 3 may be similar or identical to the stringer assembly 120. Further, although the stringer assembly 220 described herein is an I-stringer, any other type of stringer that has a noodle region may be utilized. Examples of such stringers include a J-stringer, a hat stringer, or a blade stringer, amongst others.

According to various embodiments, the left skew-angle radius filler 302A may be positioned on top of the left lower flange 346 of the left charge member 342 such that one side of the left skew-angle radius filler 302A may be in contact with the lower left web joint 350. As FIG. 3 illustrates an exploded view of the attachment point 300, the left skew-angle radius filler 302A does not appear to be in contact with the lower web joint 350. Similarly, a right skew-angle radius filler (not shown in FIG. 3) may be positioned on top of the right lower flange 366 of the right charge member 362 such that one side of the right skew-angle radius filler 302B is in contact with the lower right web joint 370.

According to some embodiments, the rib segment 210 may have a mouse hole rib configuration that allows the rib segment 210 to be positioned on top of the left and right skew-angle radius fillers 302A, 302B. In particular, the rib segment 210 includes a left leg 212 that is configured to be positioned on top of the left skew-angle radius filler 302A and a right leg 214 that is configured to be positioned on top of the right skew-angle radius filler 302B. Although the drawings and corresponding description disclose the use of skew-angle radius fillers 302 with respect to the attachment of a rib segment 210 to a stringer assembly 220, it should be appreciated that the skew-angle radius fillers 302 described herein may be utilized at any location and for any application in which components are connected near a junction between surfaces that turn through a radius and that are in danger of delamination due to operational stresses associated with the components being joined. The implementations of the skew-angle radius fillers 302 are not limited to the specific examples shown in the drawings and described herein.

Figure 4:
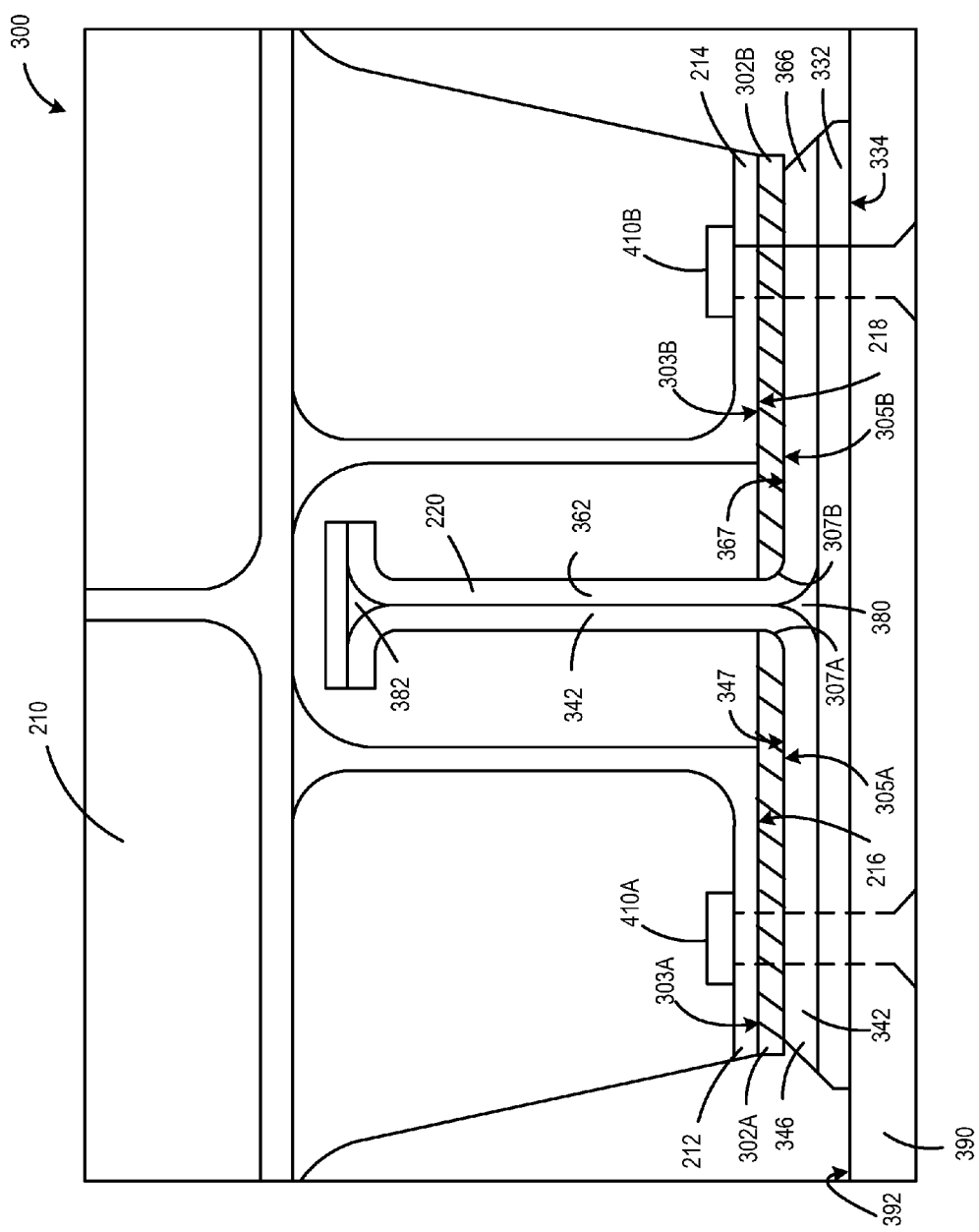
FIG. 4 shows a front view of the attachment region of the wing box shown in FIG. 2, in accordance with some embodiments described herein.

FIG. 4 shows a front view of the attachment point where the rib segment attaches to the skew-angle radius fillers in accordance with various embodiments. In FIG. 4, the rib segment 210 is attached to the stringer assembly 220 via the skew-angle radius fillers 302A, 302B. The left leg 212 of the rib segment 210 has a bottom surface 216 that is in contact with a top surface 303A of the left skew-angle radius filler 302A. The left skew-angle radius filler 302A also has a bottom surface 305A that may be in contact with an upper surface 347 of the left lower flange 346 of the stringer assembly 220. In addition, the radius contact side 304A of the left skew-angle radius filler 302A also includes an edge radius 307A that may be sized to match the radius of the web joint 350 of the left charge member 342. Further, a bottom surface 334 of the base member 332 may be in contact with an upper surface 392 of the wing skin 390. In addition, an attachment component, such as a bolt 410A may securely attach the rib segment 210, the left skew-angle radius filler 302A, the stringer assembly 220 and the wing skin 390 together. It should be appreciated that one side of the left skew-angle radius filler 302A may be in contact with the lower left web joint 350 when the various components are attached together. This provides enhanced joint capability and reduces the risk of delamination between the left charge member 342 and the lower noodle member 380. Further, it should be understood that although the edge radius 307A may be sized to match the radius of the web joint 350, there may be a gap that exists between the edge radius 307A and the web joint 350. This gap may exist due to limitations in the manufacturing and/or assembling process, The right portion of the attachment point 300 is similar to the left portion. Accordingly, on the right side, the right leg 214 of the rib segment 210 has a bottom surface 218 that is in contact with a top surface 303B of the right skew-angle radius filler 302B. The right skew-angle radius filler 302B also has a bottom surface 305B that is in contact with an upper surface 367 of the right lower flange 366 of the stringer assembly 220. In addition, the radius contact side 304B of the right skew-angle radius filler 302B also includes an edge radius 307B that may be sized to match the radius of the lower right web joint 370 of the right charge member 362. Further, an attachment component, such as a bolt 410B similar to the bolt 410A may securely attach the rib segment 210, the right skew-angle radius filler 302B, the stringer assembly 220 and the wing skin 390 together. It should be appreciated that one side of the right skew-angle radius filler 302B is in contact with the lower right web joint 370 when the various components are attached together.

Figure 5:
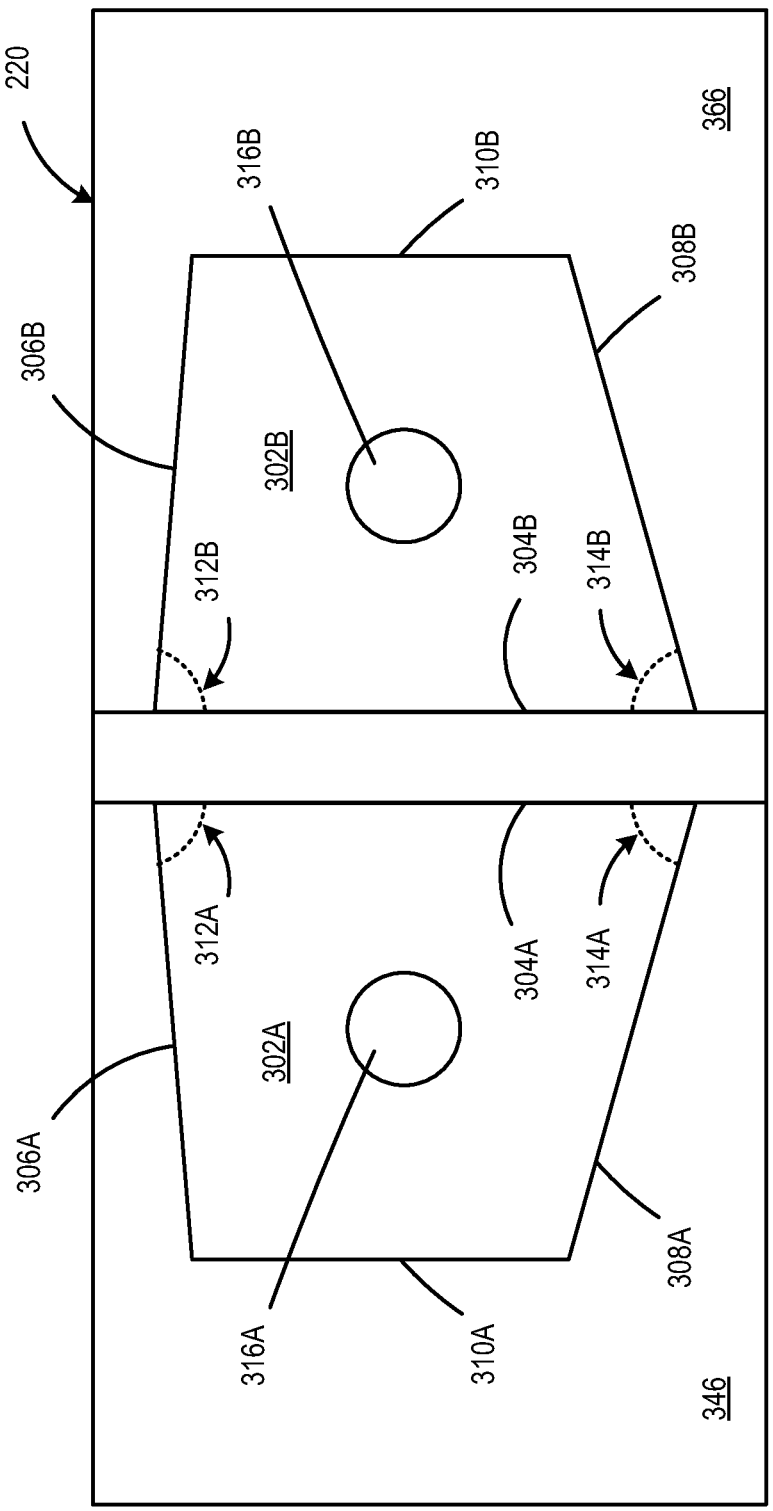
FIG. 5 shows a top view of radius fillers, in accordance with some embodiments described herein.

FIG. 5 shows a top view of two skew-angle radius fillers in accordance with various embodiments. The left skew-angle radius filler 302A is configured to attach the left leg 212 of the rib segment 210 to the left charge member 342, while the right skew-angle radius filler 302B is configured to attach the right leg 214 of the rib segment 210 to the right charge member 362.

According to embodiments, the left skew-angle radius filler 302A may include a left radius contact side 304A and a pair of non-parallel sides 306A, 308A. The left radius contact side 304A may have a curved edge having a radius that matches the radius of the lower left web joint 350 of the stringer assembly 220. According to embodiments, the radius of the lower left web joint 350 may be substantially shaped and sized to match the radius of the lower left web joint 350. A first non-parallel side 306A of the non-parallel sides may extend from the left radius contact side 304A at a first skew angle 312A, while a second non-parallel side 308A of the non-parallel sides may extend from the left radius contact side 304A at a second skew angle 314A. At least one of the non-parallel sides 306A, 308A may be a skew angle side, which may be described as a side that extends from the radius contact side at a skew angle that is substantially skewed such that the skew angle between the skew angle side and the radius contact side is between 5 degrees and 85 degrees.

According to embodiments, a skew angle is the angle formed between a radius contact side and an adjacent side. In a rectangular radius filler, the skew angles formed between the radius contact side and the adjacent sides are 90 degrees, such that the skew angles formed in a rectangular radius filler are not substantially skewed. However, according to various embodiments, in a skew-angle radius filler, such as the skew-angle radius filler 302A, one or more of the skew angles formed between the radius contact side 304A and the adjacent non-parallel sides 306A, 308A, are substantially skewed. A skew angle that is substantially skewed may be any angle extending between two lines that is within the range of about 5 degrees and 85 degrees. According to various embodiments, the first skew angle 312A and the second skew angle 314A may be within the range of about 70 degrees and about 85 degrees. Further, the first skew angle 312A and the second skew angle 314A may be equal to one another or may be different. In some embodiments, only one of the first skew angle 312A or the second skew angle 314A may be substantially skewed, while the other of the first skew angle 312A or the second skew angle 314A may be substantially perpendicular to the radius contact side 304A. It should be appreciated that both the first skew angle 312A and the second skew angle 314A may not be perpendicular to the longitudinal axis of the radius contact side 304A.

In addition, the left skew-angle radius filler 302A may also include a fourth side 310A that extends between the pair of non-parallel sides 306A, 308A. In some embodiments, the pair of non-parallel sides 306A, 308A may contact each other forming a triangle. In some embodiments, the left skew-angle radius filler 302A may have more than three sides and may also include one or more curves. An aperture 316A may also pass through the top surface 303A and the bottom surface 305A of the left skew-angle radius filler 302A. The aperture 316A may be configured to receive an attachment component, such as the bolt 410A.

Similar to the left skew-angle radius filler 302A, a right skew-angle radius filler 302B may be positioned on top of the right lower flange 366 of the stringer assembly 220. According to embodiments, the right skew-angle radius filler 302B may include a right radius contact side 304B and a pair of non-parallel sides 306B, 308B. The right radius contact side 304B may have a curved edge having a radius that matches the radius of the lower right web joint 370 of the stringer assembly 220. A first non-parallel side 306B of the non-parallel sides may extend from the right radius contact side 304B at a first skew angle 312B, while a second non-parallel side 308B of the non-parallel sides may extend from the right radius contact side 304B at a second skew angle 314B. In addition, the right skew-angle radius filler 302B may also include a fourth side 310B that extends between the pair of non-parallel sides 306B, 308B. An aperture 316B may also pass through the top surface 303B and the bottom surface 305B of the right skew-angle radius filler 302B. The aperture 316B may be configured to receive an attachment component, such as the bolt 410B.

According to embodiments, each of the skew-angle radius fillers 302A, 302B may be triangular, trapezoidal, or any other polygonal shape that includes a radius contact side configured to be in contact with a corresponding web joint of the stringer assembly, and two or more sides that may be straight or curved. At least one of the sides extending from the radius contact side may extend from the radius contact side at a skew angle that is substantially skewed.

It should be appreciated that the size and weight of the skew angle radius fillers may vary depending on trade-offs that consider weight, volume and availability of space limitations. It should further be appreciated that the amount of strength desired to reduce the risk or prevent delamination may also be taken into consideration in determining suitable dimensions of the skew-angle radius fillers.

Figure 6:
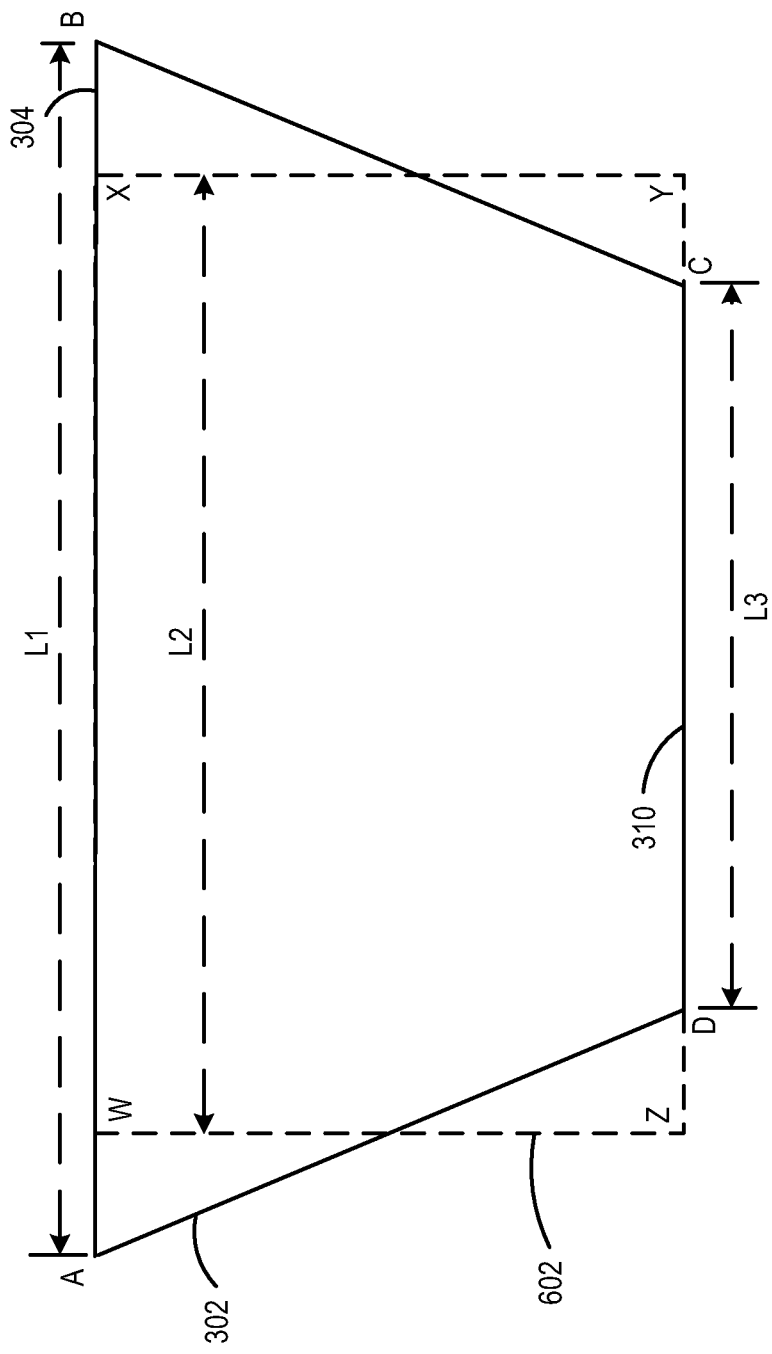
FIG. 6 shows a top view of a skew-angle radius filler and a conventional rectangular radius filler having the same volume, in accordance with some embodiments described herein.

To highlight the benefits of the skew-angle radius filler 302 over a conventional radius filler, FIG. 6, shows a top view of a skew-angle radius filler and a conventional radius filler having the same volume as the skew-angle radius filler. In FIG. 6, the skew-angle radius filler 302 is shown as the trapezoid ABCD while the conventional rectangular radius filler 602 is shown as rectangle WXYZ.

According to embodiments, the skew-angle radius fillers described herein may be constructed using the same material used in manufacturing rectangular radius fillers and may be made having the same thickness as existing rectangular radius fillers. In this manner, as long as the surface area of the skew-angle radius filler 302 is equal to the surface area of the rectangular radius filler 602, the volume of the skew-angle radius filler 302 and the rectangular radius filler 602 is equal, which also corresponds to an equal weight. The length of the radius contact side 304 is shown as L1, while the corresponding radius contact side, extending from W to X, of the rectangular radius filler 602 is L2. L1 is substantially larger than L2, such that the radius contact side 304 of the skew-angle radius filler 302 provides a larger contact surface at the web joint, thereby distributing the same operational loads over a larger area relative to the rectangular radius filler 602. It should be noted that the length of the rear side of the skew-angle radius filler 302 is shown as L3, which is shorter than the length of the radius contact side 304 of the skew-angle radius filler 302. According to technologies presented herein, skew-angle radius fillers having a first skew angle and/or a second skew angle that is substantially skewed provides enhanced joint capabilities at the noodle region of the stringer assembly compared to a rectangular radius filler having the same thickness and volume.

During operation of the aircraft, loading forces are imparted at the lower noodle region of the stringer assembly 220. The loading forces strain the laminate that holds the members of the stringer assembly 220 together. The skew-angle radius fillers help distribute the loading forces by increasing the contact area over which the loading forces are imparted. By increasing the length of the radius contact side of the skew-angle radius filler, the loading forces are distributed over a wider area but also distributed closer to the lower web joint 350 of the stringer assembly 220. This causes the loading forces to generate less shear loads per inch and less moment per inch around the lower noodle region. As a result, the stringer assembly 220 attached to the rib segment 210 using skew-angle radius fillers 302A, 302B may be able to withstand larger operational loads before causing interlaminar delamination than the stringer assembly 220 attached to the rib segment 210 using rectangular radius fillers having the same volume and thickness.

It should be appreciated that although the present disclosure utilizes an I-stringer as an example embodiment, the scope of this disclosure is not limited to such embodiments. Rather, it should be understood that skew-angle radius fillers may be utilized in a wide range of applications, including various types of stringers, such as J-stringers, hat-shaped stringers, blade stringers, and any other stringer configuration that has a noodle. Further, the scope of the present disclosure may extend to any laminated assembly that includes a noodle. By utilizing the concepts presented herein, the skew-angle radius fillers may be employed to reduce the risk of delamination around the noodle due to various types of loads, including, but not limited to, out of plane noodle pull off loads.

Figure 7:
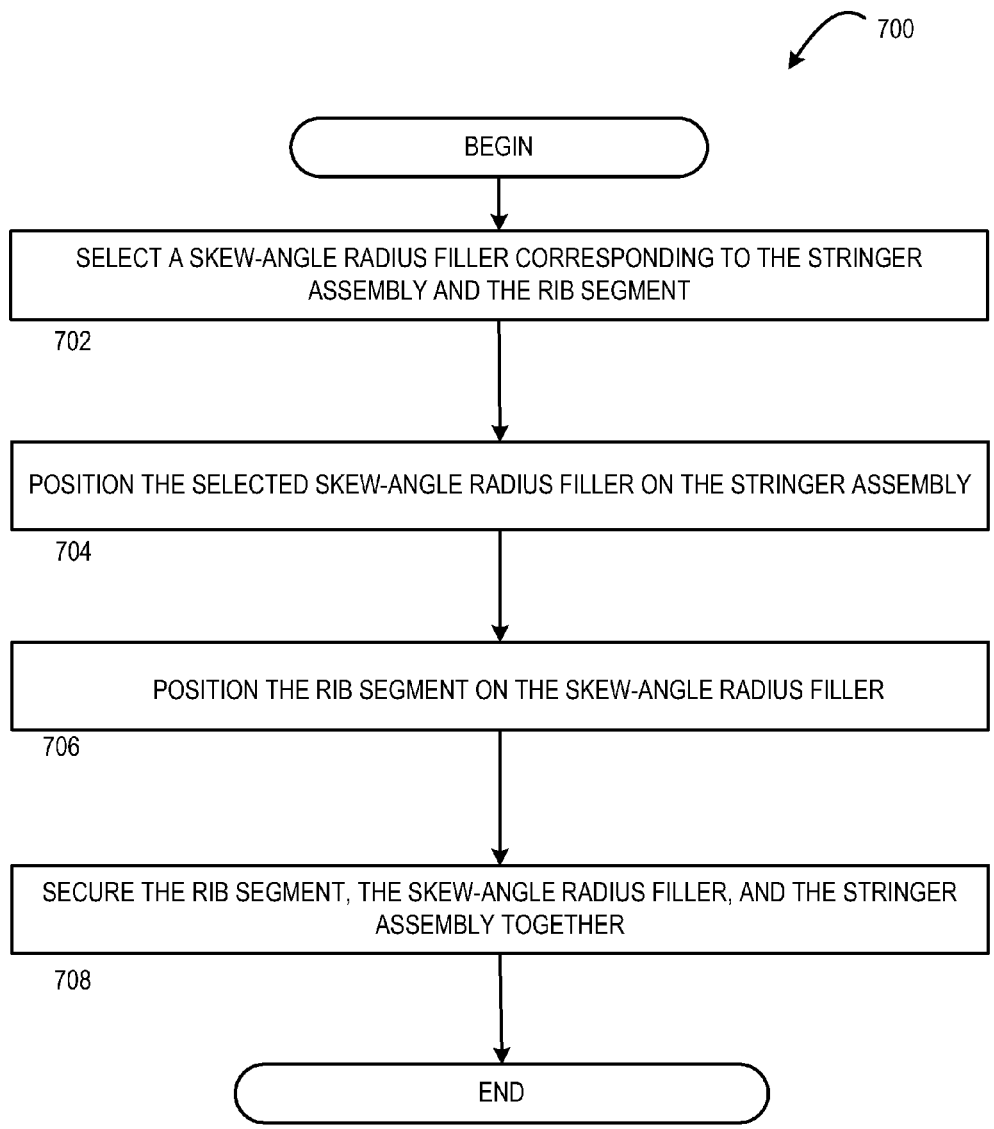
FIG. 7 is a flow diagram illustrating a process of assembling a rib segment to a skin-stringer assembly using radius fillers, in accordance with some embodiments described herein.

FIG. 7 is a flow diagram illustrating a process of assembling a rib segment to a stringer assembly using skew-angle radius fillers, in accordance with some embodiments. While the flow diagram is described in the context of attaching a rib segment to a stringer assembly, the skew-angle radius filler may be utilized in any application that includes attaching a main component, such as the stringer assembly 220 to a sub-component, such as the rib segment 210 while providing enhanced joint capabilities at a joint between a vertical member and a horizontal member of the main component.

A routine 700 begins at operation 702, where a skew-angle radius filler is selected according to a configuration of the stringer assembly 220 and the rib segment 210. In some embodiments where multiple skew-angle radius fillers 302 are to be positioned adjacent to another, the non-parallel sides of the skew-angle radius fillers may be skewed at a sufficient angle such that the non-parallel sides avoid any obstructions that may exist on the upper surface 347 of the left charge member 342 or the bottom surface 216 of the rib segment 210 that is being positioned on top of the corresponding skew-angle radius filler 302A. Examples of an obstruction may include fasteners, other objects projecting from the top surface of the stringer assembly, and the like.

From operation 702, the routine 700 proceeds to operation 704, where the bottom surface 305A of the skew-angle radius filler 302A is positioned on an upper surface 347 of the lower flange 346 of the left charge member 342 such that a radius contact side 304A of the skew-angle radius filler 302A abuts a web joint 350 of the left charge member 342. According to embodiments, the skew-angle radius filler 302A may be positioned such that the radius contact side 304A of the skew-angle radius filler 302A is abutting the web joint 350 of the left charge member 342. In some embodiments, the radius contact side includes an edge radius 307A that may be sized such that the radius of the edge radius 307A matches the radius of the web joint 350. In this way, the entire edge radius 307A may be in contact with the surface of the web joint 350.

From operation 704, the routine 700 proceeds to operation 706, where the bottom surface 216 of the rib segment 210 is positioned on top of the top surface 303A of the skew-angle radius filler 302A. It should be appreciated that the radius filler 302 may be sized and shaped independent of the size and shape of the bottom surface 216 of the rib segment.

From operation 706, the routine 700 proceeds to operation 708, where the left charge member 342, the skew-angle radius filler 302A, and the rib segment 210 are secured together utilizing an attachment means. According to embodiments, the attachment means may be a bolt 410A or any other type of fastener. In some embodiments, the attachment means may be an adhesive or other component that may or may not pass through the left charge member 342, the skew-angle radius filler 302A, and the rib segment 210. From operation 708, the routine 700 ends.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A skew-angle radius filler for enhancing joint capability at a noodle of a stringer, comprising:
    a top surface;
    a bottom surface separated from the top surface by a thickness and configured to abut an upper surface of a lower flange of the stringer;
    a radius contact side defined between the top surface and the bottom surface and having an edge radius configured to match a radius of a web joint of the stringer;
    a pair of opposing non-parallel sides defined between the top surface and the bottom surface, at least one non-parallel side extending from the radius contact side at an acute angle; and
    a rear side having a length shorter than a length of the radius contact side.

2. The skew-angle radius filler of claim 1, wherein a first skew angle side of the pair of opposing non-parallel sides extends from the radius contact side at a first skew angle that is substantially skewed such that the first skew angle between the first skew angle side and the radius contact side is between 5 degrees and 85 degrees.

3. The skew-angle radius filler of claim 2, wherein the first skew angle is in the range of about 70 degrees to 85 degrees.

4. The skew-angle radius filler of claim 2, wherein a second skew angle side of the pair of opposing non-parallel sides extends from the radius contact side at a second skew angle that is substantially skewed such that the second skew angle between the second skew angle side and the radius contact side is between 5 degrees and 85 degrees.

5. The skew-angle radius filler of claim 4, wherein the second skew angle is in the range of about 70 degrees to 85 degrees.

6. The skew-angle radius filler of claim 5, wherein the first skew angle and the second skew angle are equal.

7. The skew-angle radius filler of claim 5, wherein the first skew angle and the second skew angle are different.

8. A structural system for redistributing operational loads imparted at a noodle of a stringer assembly, comprising:
    a rib segment having a bottom surface;
    a stringer assembly having a vertical member, a horizontal member and a web joint at an interface between the vertical member and the horizontal member, the horizontal member having an upper surface;
    a radius filler configured to enhance joint capability at the noodle of the stringer assembly, comprising
    a top surface in contact with the bottom surface of the rib segment,
    a bottom surface in contact with the upper surface of the horizontal member of the stringer assembly,
    a radius contact side having an edge radius configured to match a radius of a corresponding web joint of the stringer assembly, and
    a pair of opposing non-parallel sides, at least one non parallel side extending from the radius contact side at an acute angle; and
    a rear side having a length shorter than a length of the radius contact side.

9. The structural system of claim 8, wherein a first skew angle side of the pair of opposing non-parallel sides extends from the radius contact side at a first skew angle that is substantially skewed.

10. The structural system of claim 9, wherein the first skew angle is in the range of about 70 degrees to 85 degrees.

11. The structural system of claim 9, wherein a second skew angle side of the pair of opposing non-parallel sides extends from the radius contact side at a second skew angle that is substantially skewed.

12. The structural system of claim 11, wherein the second skew angle is in the range of about 70 degrees to 85 degrees.

13. The structural system of claim 11, wherein the first skew angle and the second skew angle are equal.

14. The structural system of claim 11, wherein the first skew angle and the second skew angle are different.

15. The structural system of claim 8, wherein the stringer assembly is an I-stringer, a J-stringer, a blade stringer or a hat-shaped stringer.

16. A method of enhancing joint capability at a noodle of a stringer, comprising:
　　positioning a bottom surface of a skew-angle radius filler on a top surface of a main component such that a radius contact side of the skew-angle radius filler abuts a web joint of the main component, such that a shorter rear side of the skew-angle radius filler is opposite the web joint;
　　positioning a bottom surface of a sub-component against a top surface of the skew-angle radius filler; and
　　securing the main component, the skew-angle radius filler, and the sub-component utilizing an attachment means.

17. The method of claim 16, wherein the skew-angle radius filler comprises:
　　a pair of opposing non-parallel sides, at least one non-parallel side extending from the radius contact side at an acute angle.

18. The method of claim 17, further comprising selecting a skew-angle radius filler according to a configuration of the main component and the sub-component such that the at least one skew angle side is skewed at a sufficient angle to position the at least one skew angle side away from any obstruction.

19. The method of claim 18, wherein the main component is a stringer assembly and the sub-component is a rib segment.

20. The method of claim 18, wherein attaching a bottom surface of a rib segment on the top surface of the radius filler comprises:
　　positioning the bottom surface of the rib segment on the top surface of the radius filler; and
　　passing a bolt through the rib segment, the radius filler and the stringer.

* * * * *